(12) United States Patent
Remond et al.

(10) Patent No.: US 7,304,267 B2
(45) Date of Patent: *Dec. 4, 2007

(54) METHOD AND A DEVICE FOR DEPOSITING A WELDING MATERIAL IN AN ANNULAR FACING MACHINED IN A SPHERICAL WALL

(75) Inventors: Etienne Remond, Chalon sur Saone (FR); Francois Prouteau, Saint Marcel (FR)

(73) Assignee: Framatome ANP, Courbevoie (FR)

( * ) Notice: Subject to any disclaimer, the term of this patent is extended or adjusted under 35 U.S.C. 154(b) by 112 days.

This patent is subject to a terminal disclaimer.

(21) Appl. No.: 11/048,730

(22) Filed: Feb. 3, 2005

(65) Prior Publication Data

US 2005/0205527 A1    Sep. 22, 2005

(30) Foreign Application Priority Data

Feb. 6, 2004    (FR) .................................. 04 01188

(51) Int. Cl.
*B23K 9/04*    (2006.01)

(52) U.S. Cl. ............................... 219/125.11; 219/76.14

(58) Field of Classification Search ........... 219/124.21, 219/124.34, 125.11, 76.12, 76.14
See application file for complete search history.

(56) References Cited

U.S. PATENT DOCUMENTS 4,409,466 A * 10/1983 Commeau ............... 219/137 R
4,551,603 A * 11/1985 Rocklin .................... 219/76.13
4,629,853 A * 12/1986 Yttergren et al. ......... 219/60 A
4,897,519 A * 1/1990 Clark et al. .............. 219/76.14
4,903,888 A * 2/1990 Clark et al. ................. 228/119
5,399,836 A * 3/1995 Carpenter et al. ..... 219/125.11
5,428,198 A * 6/1995 Peigney et al. ............... 219/61
5,515,589 A * 5/1996 Kazirskis et al. ......... 29/402.18

FOREIGN PATENT DOCUMENTS

EP          0 609 108 A1    8/1994
JP          2001018066      1/2001
SU          1 368 127 A     1/1988

* cited by examiner

*Primary Examiner*—Len Tran
(74) *Attorney, Agent, or Firm*—Connolly Bove Lodge & Hutz LLP

(57) ABSTRACT

Welding material is deposited automatically in the annular facing. A welding torch is causes to rotate about an axis of rotation that extends in a direction that is radial relative to the spherical wall and that passes through a point of the concave inside surface of the spherical wall in the central portion of the annular facing. Simultaneously with the welding torch being caused to rotate about the axis of rotation, it is displaced in a direction perpendicular to the axis of rotation in controlled manner, and the position of the welding torch in a direction parallel to the of rotation is also controlled so that the electrode of the welding torch describes an elliptical path and ensures that the welding material is deposited in the annular facing in the form of an elliptical bead.

6 Claims, 6 Drawing Sheets

METHOD AND A DEVICE FOR DEPOSITING A WELDING MATERIAL IN AN ANNULAR FACING MACHINED IN A SPHERICAL WALL

FIELD OF THE INVENTION

The invention relates to a method and a device for depositing a welding material in an annular facing machined in the concave inside surface of a spherical wall, and in particular to a method of initially preparing a layer of bonding metal for securing a tube passing through a spherical wall, such as an adapter secured in the vessel head of a pressurized water nuclear reactor.

BACKGROUND OF THE INVENTION

Nuclear reactors cooled by pressurized water generally comprise a vessel of cylindrical shape placed, in service, with its axis vertical and having a bottom end constituted by a round bottom secured to a bottom end of the cylindrical wall of the vessel, and a top end constituting a support flange for a head which is generally of hemispherical shape and which can be secured to the vessel in a manner that is proof against the pressurized water contained in the vessel while the nuclear reactor is in operation. After the primary circuit of the nuclear reactor has been cooled and depressurized, the head can be dismounted in order to give access to the inside of the vessel which contains the core of the nuclear reactor.

In general, the reactivity of the nuclear reactor core is adjusted by means of control rods of absorbent material which are moved vertically inside the nuclear reactor core. The nuclear reactor control rods are secured to the bottom ends of drive shafts that pass through the vessel head inside tubular adapters that are of generally cylindrical shape and that have mechanisms secured thereto for moving the control rods in the vertical direction.

While the nuclear reactor is in operation, temperature measurements are taken inside its core by means of columns of thermocouples which likewise pass through the vessel head inside adapters.

The vessel head thus has a plurality of cylindrical tubular adapters passing through it, each being secured to the inside of a bore having a vertical axis (when the head is in its in-service position on the vessel), with the various adapters being distributed in a plurality of rows and in a plurality of zones of the head that are annular about the vertical axis that is common to the vessel and the head and on which the center of the spherical wall of the vessel head is situated. Depending on their positions through the vessel head, the bores through which the adapters pass (which are all parallel to the axis of the vessel head), themselves have axes at various acute angles relative to the radii of the hemispherical head passing through respective points on the axes of the bores. In particular, one of the annular rows of bores passing through the vessel head is disposed in such a manner that the axes of the bores are at an angle of about 38° relative to the corresponding radii of the hemispherical vessel head. In general, the bores have axes that do not pass through the center of the hemispherical head (with the exception of one bore that is placed on the vertical axis of the vessel), and the intersections between the bore of cylindrical shape with the outside and inside walls of the vessel head present shapes that are complex.

Each adapter passing through the vessel head presents both a top portion that projects above the vessel head, said portions having secured thereto, in particular, the mechanisms for moving the control rods, and a bottom portion that projects beneath the vessel head, which bottom portion is shorter relative to the inside surface of the head than is the corresponding top portion, and serves in particular to receive a cone for re-engaging a drive shaft.

The adapter tubes are generally made of a nickel-based alloy such as 690 alloy, and the vessel head is made of a low-alloy ferritic steel and coated on its inside surface in a layer of stainless steel. The adapter tubes must be secured in their bores passing through the head in such a manner as to be completely proof against the pressurized water that fills the vessel while the nuclear reactor is in operation (at a temperature of about 320° C. and at a pressure of about 155 bars) and they must be capable of withstanding the pressure inside the vessel.

The adapter tubes are engaged tightly in the bores passing through the vessel head and they are secured by being welded to the inside portion of the vessel head which is constituted by low-alloy steel coated in stainless steel. In each of the zones of the inside portion of the head in which a passage is made for an adapter tube, an annular facing is machined to surround the bore through which the adapter tube passes, and a welding material that is metallurgically compatible with the material of the adapter tube is deposited in the facing by welding (generally by melting a wire). Thereafter, the head is drilled to form the bore for passing the adapter, the adapter is secured tightly in the bore, and finally the adapter is welded by depositing a welding material in a portion of the facing around the tubes, in order to secure the adapter to the previously-deposited layer of welding material.

The operation of depositing a layer of welding material in the annular facing prior to drilling the bore is generally referred to by the term "buttering".

Until now, the operations of initially depositing a first welding material in the annular facing prior to drilling the bore, and of welding the adapter tube by depositing a second welding material in the remaining portion of the facing after the bore has been drilled and the adapter tube mounted therein, have been performed manually, in particular because of the complex shape of the connection surfaces between the adapters and the inside portion of the vessel head.

Such operations are lengthy and expensive and require numerous inspections, since the welding must be free from defects. The number of adapter tubes secured to a vessel head is generally large (e.g. 65 or 77 adapter tubes, depending on the type of nuclear reactor), which makes this operation extremely lengthy and expensive.

OBJECTS AND SUMMARY OF THE INVENTION

It is therefore very desirable to have methods available for automatically depositing welding material for the purpose of performing buttering prior to securing adapters to the concave spherical wall of a vessel head.

More generally, it can be desirable to have available automatic methods of depositing welding material when securing tubes of generally cylindrical shape in spherical walls by welding, in particular when the tubes are secured in such a manner that their axes do not pass through the center of the spherical wall.

The object of the invention is thus to provide a method of depositing a welding material in an annular facing machined in the concave inside surface of a spherical wall at the periphery of a zone of the spherical wall that is to receive a through tube, which method can be implemented with reduced execution time and be implemented with very good quality.

For this purpose, the welding material is deposited automatically by performing the following operations:

causing a welding torch comprising means for melting and means for feeding welding material to rotate about an axis of rotation extending in a direction that is radial relative to the spherical wall and that passes through a central point of the annular facing where the inside surface of the spherical wall intersects the axis of the through tube; and simultaneously causing the welding torch to move in a direction perpendicular to the axis of rotation in controlled manner, and adjusting the position of the welding torch in a direction parallel to the axis of rotation in such a manner as to deposit the welding material in the annular facing in the form of at least one elliptical weld bead having characteristics that are constant.

In particular implementations taken singly or in combination:

the welding material is deposited in successive passes in order to deposit successive weld beads of elliptical shape extending around the entire periphery of the annular facing, which beads are superposed and juxtaposed in the direction perpendicular to the axis of rotation, by displacing the welding head through a predetermined fixed direction in the direction perpendicular to the axis of rotation between two successive welding passes;

the successive passes for depositing successive weld beads are performed by causing the welding torch to rotate about axes of rotation extending in a radial direction relative to the spherical surface, which axes are offset relative to one another in the direction perpendicular to the direction that is radial to the spherical surface;

the speed of angular rotation of the welding torch about the axis of rotation is caused to vary in discontinuous manner in order to obtain a substantially constant linear speed of displacement for the electrode of the welding torch relative to the annular facing, the electrode of the welding torch following a path that is elliptical while facing the annular facing;

a first plurality of angular sectors of constant amplitude is determined about the axis of rotation of the welding torch, and for each of the angular sectors, a speed of angular rotation is determined to which the welding torch is subjected during its displacement within the angular sector along a portion of the elliptical path;

programmed displacements are determined for the welding torch in the Y direction perpendicular to the axis of rotation simultaneously with rotation of the welding torch about the axis of rotation by determining a second plurality of angular sectors of constant amplitude about the axis of rotation and by determining, for each of the angular sectors in the second plurality of angular sectors followed by the welding torch during rotation about the axis of rotation, a respective initial value on entry into the angular sector and a final value on exit from the angular sector for the displacement of the welding torch in the Y direction, between which values the displacement of the welding torch in the Y direction varies in continuous manner during the displacement of the welding torch within the angular sector; and at least two weld beads are deposited that are superposed and juxtaposed in the Y direction within the facing by successive passes during each of which the welding torch moves along an elliptical path, and different displacement values in the Y direction are determined for the welding torch for each of the elliptical paths within each of the angular sectors of the second plurality of angular sectors.

The invention also provides a device for depositing a welding material in an annular facing machined in the concave inside surface of a spherical wall at the periphery of a zone of the spherical wall that is to receive a through tube, the device comprising a shaft having means for securing it to the spherical wall in a radial direction of the spherical wall in a zone of the spherical wall in the central portion of the annular facing, a welding head rotatably mounted on the shaft to rotate about an axis of rotation extending in the radial direction and including motor-driven drive means for driving the rotation, a first motor-driven carriage mounted to move on the welding head in a direction perpendicular to the axis of rotation of the welding head, a second motor-driven carriage mounted to move in a direction parallel to the axis of rotation on the first motor-driven carriage, a welding torch secured to the second motor-driven carriage and comprising an electrode, means for feeding current to the electrode, and means for feeding a welding material to the vicinity of the welding electrode and having motor-driven means for feeding the electrode with welding material, and a control unit for controlling the motor-driven means of the welding head, of the first and second motor-driven carriages, and the means for feeding current and welding material to the electrode of the welding torch.

In a particular embodiment, the shaft of the automatic welding device is made in such a manner as to be capable of being secured in an opening machined by drilling into the spherical wall in the central portion of a reserve of metal inside the facing and in a direction that is radial relative to the spherical wall.

BRIEF DESCRIPTION OF THE DRAWINGS

In order to enable the invention to be well understood, there follows by way of example a description made with reference to the accompanying figures of a method of automatic deposition in accordance with the invention, in the context of an operation of securing an adapter in the vessel head of a nuclear reactor.

MORE DETAILED DESCRIPTION

Figure 1:
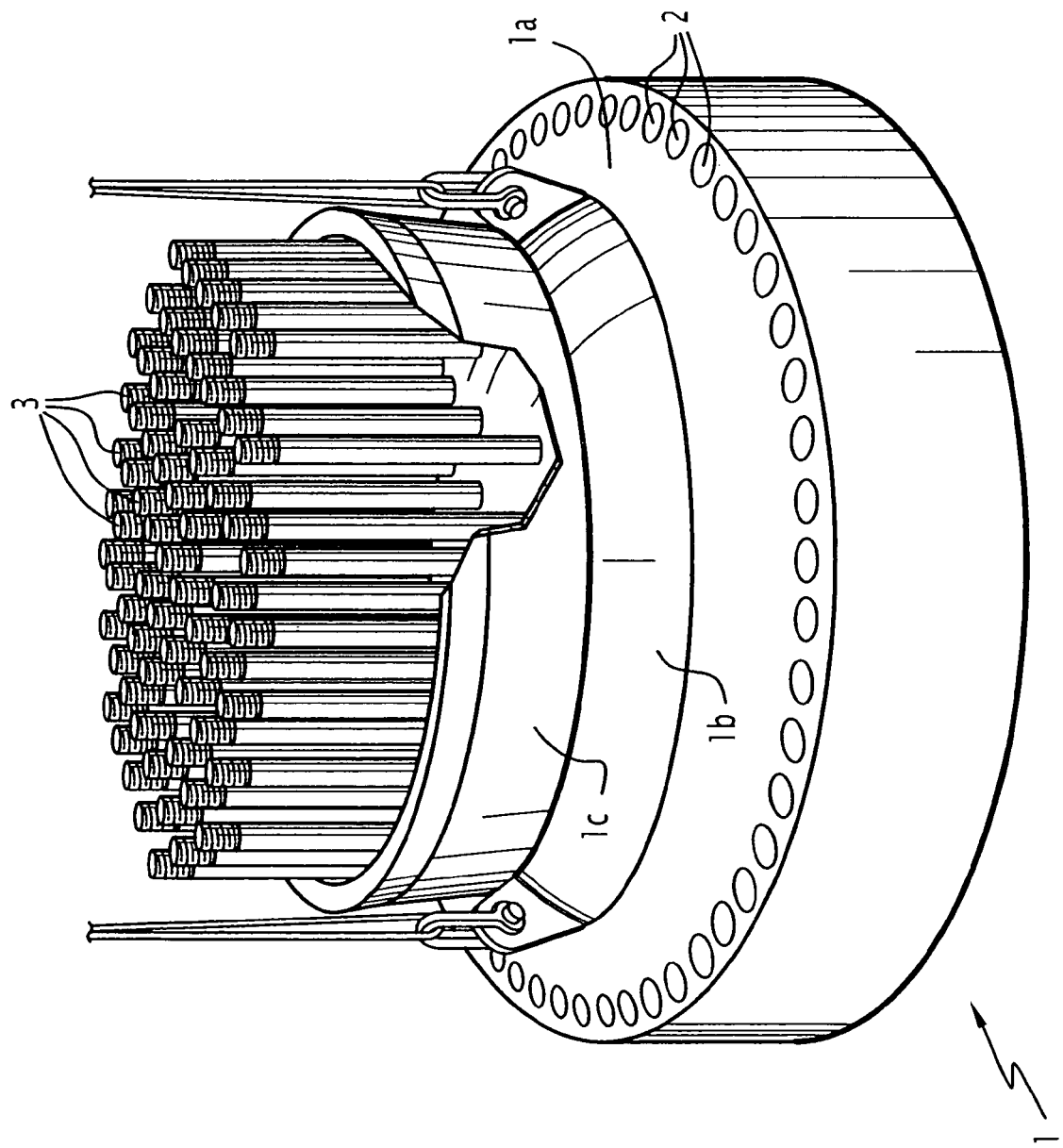
FIG. 1 is a perspective view of the vessel head of a pressurized water nuclear reactor in the cap position.

FIG. 1 shows a pressurized water nuclear reactor vessel head given overall reference 1.

The vessel head has an annular flange 1a of very great thickness for fitting onto a flange constituting the top portion of the vessel. The flange 1a is pierced by openings 2 for passing studs for securing the vessel head on the vessel flange.

The central portion 1b of the vessel head is in the form of a spherical cap and is pierced by openings for securing a plurality of adapters 3 that are disposed so that their axes are parallel to the axis of symmetry of the vessel head. In FIG. 1, the vessel head 1 is shown placed in a "cap" position, the head resting on horizontal ground via its flange 1a, and with the spherical cap constituting the central portion 1b of the vessel head having its convex rounded portion directed upwards. In this disposition, the axis of the vessel head and the axes of the adapters 3 are all vertical. Around the set of adapters (the head shown has 65 adapters) there is disposed a cylindrical connector 1c secured to the vessel head and enabling a cylindrical protective casing (not shown) to be placed around the adapters.

As can be seen in FIG. 1, the adapters are distributed over the surface of the spherical cap 1d constituting the central portion of the vessel head in rectilinear rows and in annular rows around the axis of the vessel. As a result, apart from a central adapter, the adapters have vertical axes that do not intersect the axis of the vessel passing through the center of the spherical surface of the cap 1b.

Figure 2:
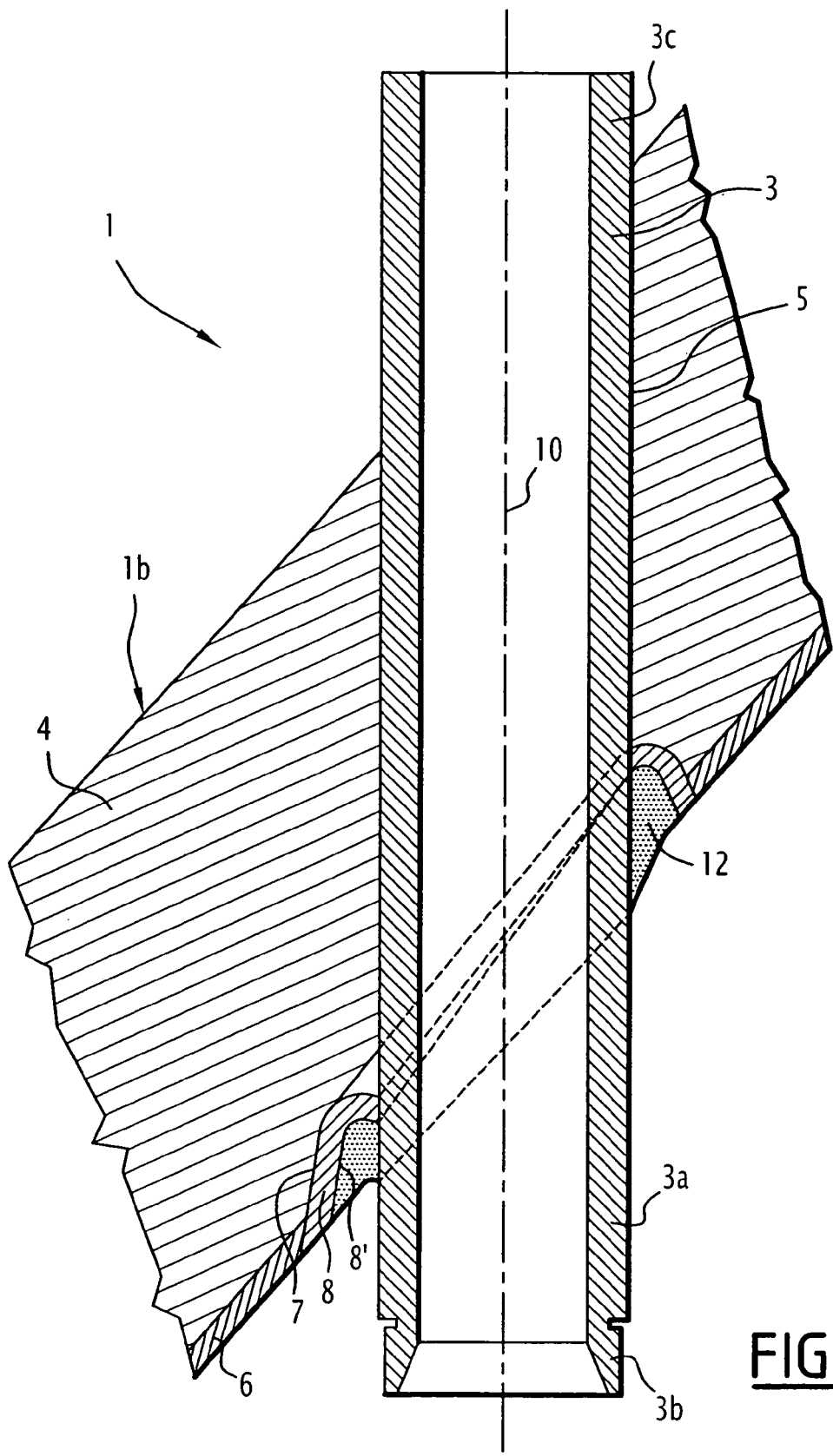
FIG. 2 is a section view of a bottom portion where an adapter is secured to a vessel head.

FIG. 2 is a section on a vertical plane showing a zone of the thick wall 4 of a vessel head in its portion 1b that is in the form of a spherical cap. The portion shown of the wall 4 corresponds to a zone for securing an adapter 3. In the zone for securing the adapter 3, the wall 4 of the spherical-cap shape vessel head (shown in the cap position) is pierced by an opening 5 in which the adapter tube 3 is engaged and secured. The wall 4 of the low-alloy ferritic steel vessel head is internally covered in a coating layer of stainless steel 6.

After the wall 4 of the head has been forged and machined, a layer of stainless steel (24% chromium and 12% nickel, or 20% chromium and 10% nickel) is deposited on the concave inside surface of the vessel head using a submerged arc welding method employing a machine fed with stainless steel strip.

After making the stainless steel layer over the entire inside surface of the wall 4 of the vessel head, an annular facing 7 is made in each of the zones for securing an adapter 3 to the inside surface of the head, with the section of the facing being asymmetrical, as shown in FIG. 2. Thereafter, a buttering layer 8 of nickel alloy (such as 152 alloy when securing an adapter 3 made of nickel 690 alloy) is deposited inside each of the annularly-shaped facings 7.

Figure 3:
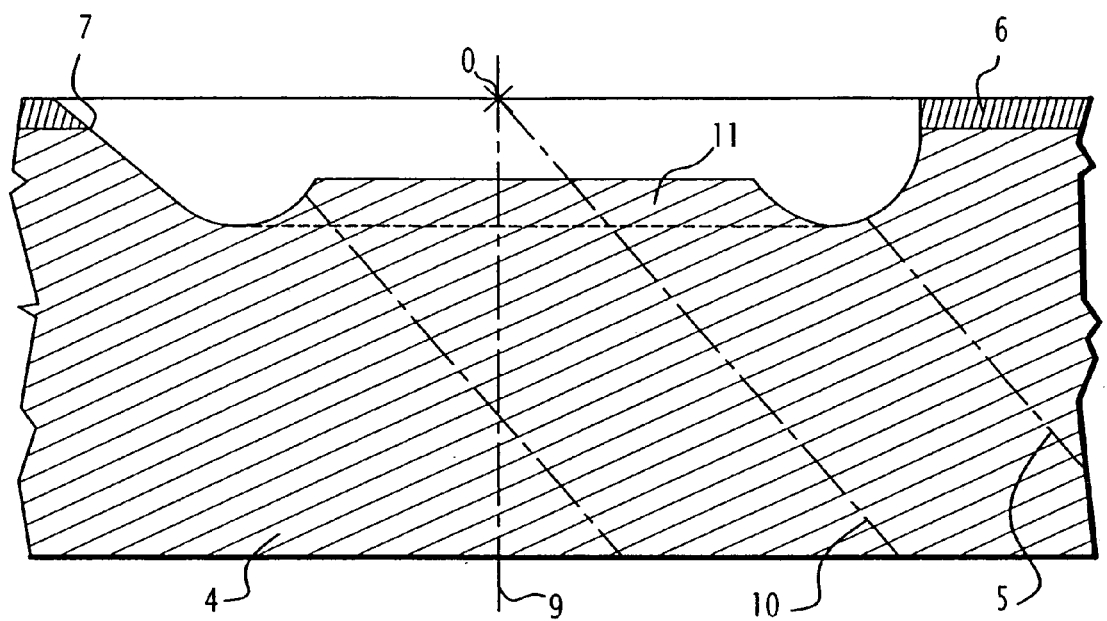
FIG. 3 is a section view showing a portion of the vessel wall in the bowl position in a zone for securing an adapter tube, after machining an annular facing.

FIG. 3 shows a zone of the inside surface of the wall 4 of the vessel head in which an annular facing 7 has been machined around a zone through which a bore 5 will subsequently be made for passing the adapter tube 3.

In FIG. 3, the wall 4 of the vessel head is shown in a bowl position, i.e. in a position in which the concave portion of the vessel head is directed upwards. Conventionally, in FIG. 3, the wall is shown as being practically plane in the zone where an adapter passes therethrough that extends over a short distance in the circumferential direction of the inside surface of the wall 4.

In addition, FIG. 3 shows the axis 10 on the bore is drilled and the radial direction 9 of the wall that intersects the axis 10 of the bore 5 at a central point O in the zone where the adapter passes through the concave inside surface of the vessel head 1. In conventional manner and to make the drawing easier to understand, the radial direction 9 of the wall 4 is shown as being in a vertical disposition.

The bore 5 for passing an adapter is shown in FIG. 3 as being located in a zone of the spherical wall 4 such that the angle between the axis 10 of the bore 5 and the radial direction is a little greater than 38°.

The facing 7 of annular shape is made around an axis disposed on the radial direction 9 of the hemispherical envelope 4 and passing through the point O of intersection between the axis 10 of the bore 5 for receiving the tube and the inside surface of the wall 4, the facing being made by machining the inside surface of the hemispherical wall 4. The facing 7 is made by milling so as to obtain a profile of well-defined and asymmetrical shape, as can be seen in FIG. 3. A reserve of metal 11 of the wall is retained in the central portion of the annular facing 7, through which the bore 5 for passing the tube will subsequently be machined after a layer of buttering material has been deposited in the annular facing 7.

In the invention, the operation of depositing the welding material in the facing 7, known as "buttering" is performed in totally automatic manner.

Figure 4:
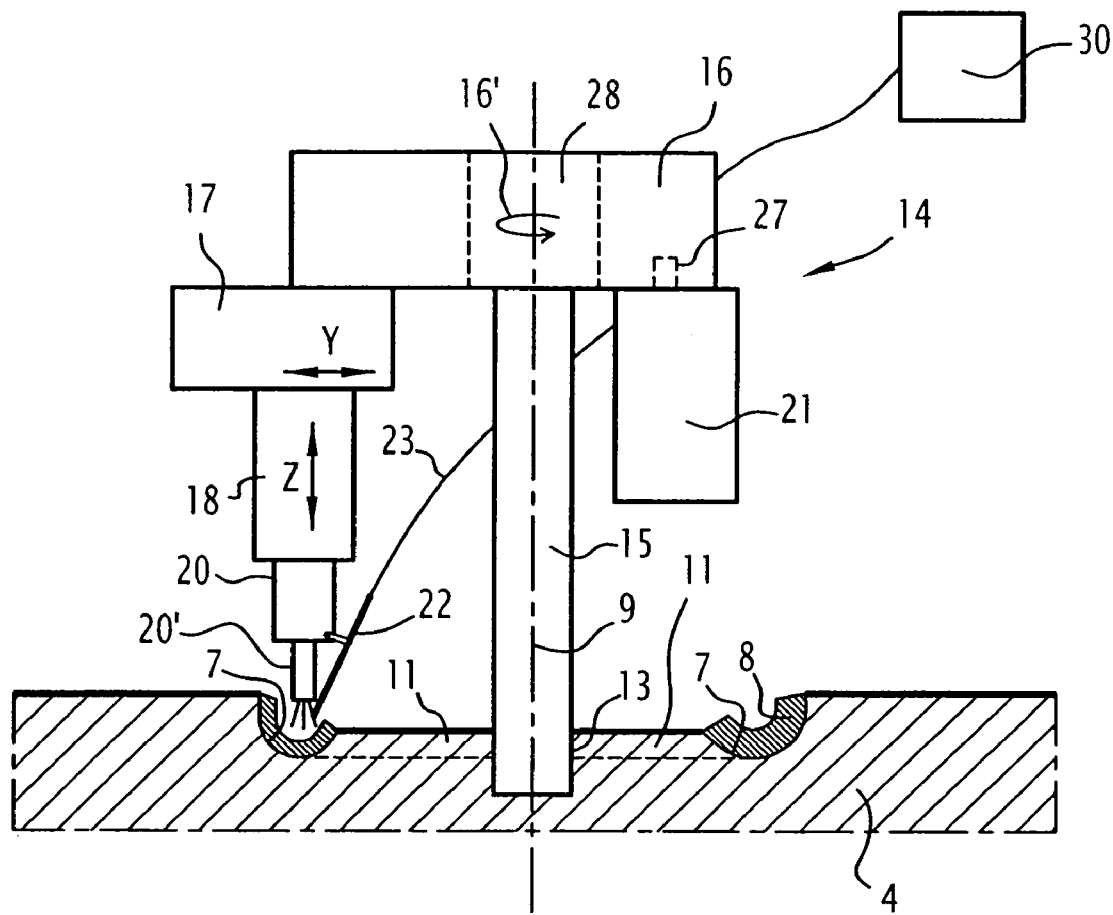
FIG. 4 is a diagrammatic view of a welding device for prior deposition of a welding material in the annular facing using the method of the invention.

FIG. 4 shows an automatic welding device that can be used for implementing the method of the invention for automatically depositing welding material.

As in FIG. 3, the wall 4 of the vessel head is shown in a zone for securing an adapter, the wall being shown in the bowl position so that the concave inside surface of the wall 4 is upwardly directed and the radial direction 9 of the wall 4 passing through the center of the hemispherical wall and also through the center O of the facing on the inside surface of the wall is placed vertically.

Compared with the prior methods in which buttering is performed manually, in order to perform this operation automatically, as shown in FIG. 4, a facing 7 is machined that is of a width that is reduced and accurately constant around the entire periphery of the facing, which width is equal to a multiple of the width of a weld bead as deposited in automatic manner. This avoids any need to deposit partial weld beads in order to make the buttering layer.

After the facing 7 has been machined, a hole is drilled in the central portion of the reserve of metal 11 on the direction of the axis 9 so as to obtain a bore 13 in which a shaft 15 is secured on the axis of the radial direction 9 at the hemispherical inside surface of the wall 4.

The shaft 15 has a rotary head 16 of the welding device mounted thereon, which head carries drive means 28 for driving it in rotation about the radial direction axis 9, as represented by curved arrow 16'. The rotary welding head 16 carries firstly an automatic welding torch 20 via a first motor-driven carriage 17 that is radially displaceable, i.e. along a Y direction perpendicular to the axis 9, and a second motor-driven carriage 18 that is axially displaceable, i.e. along the Z direction parallel to the axis 9, and secondly a reel of welding wire 21 for feeding a wire guide 22 facing towards the electrode 20' of the torch 20. The electrode 20' of the welding torch 20 is fed with welding current so that an arc is struck between the end of the electrode 20' and the bottom of the facing 7. The welding wire 23 fed to the wire guide 22 by the reel fitted with a motor-driven unreeling device 27 is melted by the arc so as to deposit a weld bead in the bottom of the facing 7.

The welding wire 23 is preferably a coated wire with the metal portion thereof being made of nickel alloy, e.g. alloy 152.

In order to perform automatic welding, the welding head 16 is set into rotation as represented by the arrow 16' under drive from its motor means 28. To make a weld bead in a portion of the facing, the position of the welding torch 20 is initially adjusted along the Y direction perpendicular to the axis 9 of rotation of the head 16 using the first motor-driven carriage 17.

While the welding head 16 is rotating about the axis 9, the welding torch 20 is moved in controlled manner along the Y direction by the first motor-driven carriage 17 so as to describe an elliptical path over the annular facing 7 whose overall shape is elliptical.

In order to ensure that the electrode 20' remains accurately positioned relative to the surface of the facing 7 on which the welding material is deposited, the position of the torch 20 is adjusted along the Z direction parallel to the radial direction axis 9 by means of the second motor-driven carriage 18. This enables the distance between the end of the electrode 20' of the welding torch 20 and the surface at the bottom of the facing 7 to be adjusted to an accurately constant value. The electric arc between the facing and the end 20' of the electrode traveling around an elliptical path is thus accurately adjusted, thereby adjusting the conditions under which the welding wire 23 melts.

In addition, the speed of rotation of the welding head 16 about the axis 9 is controlled to obtain an accurately constant linear speed for the electrode 20' of the welding torch 20 relative to the bottom of the facing.

As explained below, the speed of rotation of the welding head 16 can be adjusted in discontinuous manner to have different values depending on the portion of the elliptical path over which the electrode 20' of the welding torch 20 is moving.

The adjustment of the speed of rotation of the welding head 16, of the displacements of the welding head in the Y direction under drive from the carriage 17, and of the position of the torch 20 in the vertical Z direction under drive from the second carriage 18 are controlled by a control unit 30 connected to the welding head 16. The control unit 30 serves to control the drive motors 28 of the welding head 16 and of the carriages 17 and 18 while the head 16 is rotating. In addition, the control unit 30 regulates the melting current delivered to the welding torch 20 and the rate at which the welding wire 23 is fed by the drive means 27 so that the welding speed deposited in the facing 7 presents characteristics that are accurately constant, i.e. in particular of a width, a section, and a volume per unit length that are accurately constant.

Figure 5:
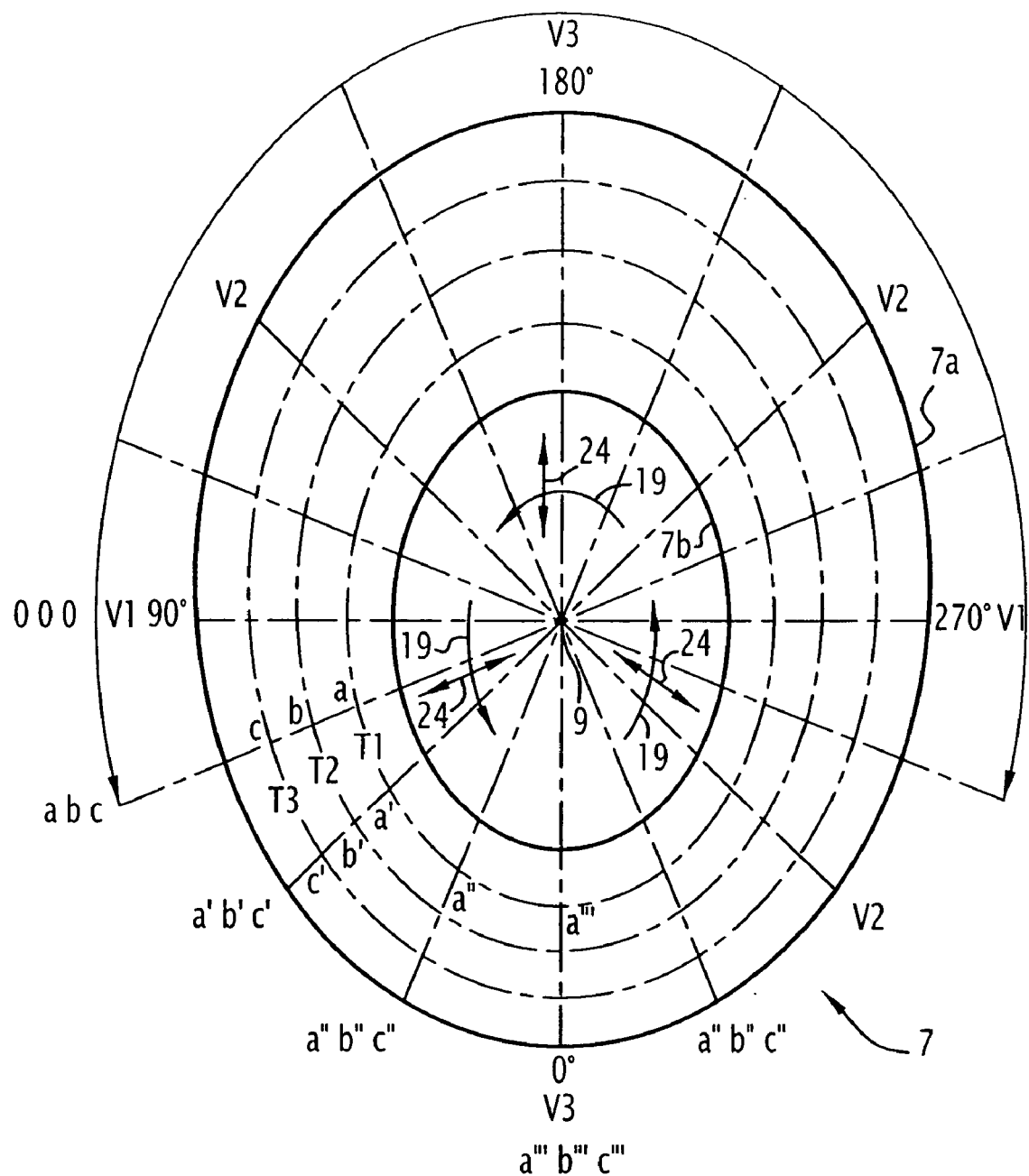
FIG. 5 is a plan view of the annular facing and of the elliptical paths followed by a torch of a welding device for depositing successive welding beads.

FIG. 5 shows the facing 7 in a plane perpendicular to the axis 9 extending radially relative to the hemispherical surface, the facing 7 presents an outside edge 7a and an inside edge 7b having elliptical outlines with the elliptically annular facing 7 extending between them. In order to provide a continuous layer of buttering inside the facing 7, three superposed weld beads are made that are juxtaposed across the width of the facing, each of the weld beads being deposited during a pass during which the welding torch executes one complete revolution about the axis 9, the electrode 20' of the welding torch 20 following a path that is elliptical relative to the bottom of the facing.

FIG. 5 shows three elliptical paths T1, T2, and T3 followed by the electrode 20' of the welding torch 20 during three successive stages of making three weld beads for covering the bottom of the annular facing 7.

Figure 6:
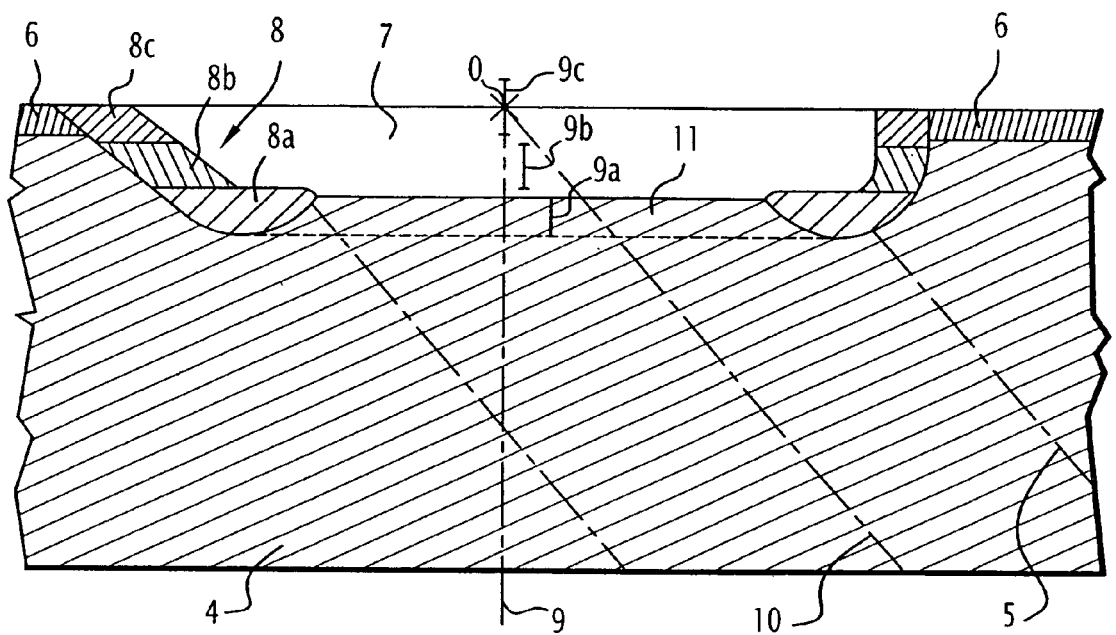
FIG. 6 is a section view analogous to the view of FIG. 3 after the welding beads have been deposited in the annular facing.

FIG. 6 is a section view on a plane containing the radial direction axis 9, showing the three weld beads 8a, 8b, and 8c as deposited respectively during the first, the second, and the third passes of depositing welding material, the electrode moving along the respective paths T1, T2, and T3 shown in FIG. 5.

FIG. 5 also shows the axes along directions 0°-180° and 90°-270° that correspond respectively to the major and minor axes of the elliptical outlines of the annular facing 7. The angular positions of the torch and of the welding electrode during rotation are defined on the basis of these axes.

In order to vary the speed of angular rotation of the head and the welding torch so as to obtain a linear speed that is substantially constant for the welding electrode relative to the bottom of the facing, the elliptical paths T1, T2, and T3 are subdivided into angular sectors in which the paths followed do not depart successively from a circle centered on the radial direction axis 9. Thus, eight angular sectors are defined, each having an amplitude of 45°. Because of symmetry, two elliptical sectors centered on the major axis 0°-180° are identical in shape, and two sectors centered on the minor axis 90°-270° are likewise identical in shape, while the other four sectors between the two sectors situated on the major axis and the two sectors situated on the minor axis of the elliptical outlines are likewise mutually identical.

An angular speed V1 of rotary displacement of the head and the welding torch is selected for the two sectors centered on the minor axis 90°-270°, an angular speed V3 is selected for the two sectors centered on the major axis 0°-180° of the ellipses, and an intermediate speed V2 is selected for the four remaining sectors between the sectors centered respectively on the major and the minor axes of the ellipses.

The angular speeds V1, V2, and V3 are selected in such a manner that V1>V2>V3. The speeds V1, V2, and V3 are determined in such a manner that given the differing mean radii of the paths in each of the angular sectors, the linear speed of the welding torch and the electrode relative to the bottom of the facing is substantially constant in all portions of the paths.

In addition, in order to cause the electrode to travel along the elliptical paths T1, T2, and T3 while the welding head 16 is rotating about the axis 9, it is necessary to cause the welding torch to move in the direction Y simultaneously with its rotation. These displacements of the welding torch are obtained by the first motor-driven carriage 17.

As shown in FIG. 5, displacements in the direction Y (represented by double-headed arrows 24) while rotating about the axis 9 (represented by curved arrows 19) are adjusted successively to occupy defined ranges within successive angular sectors.

As the initial angular position for the rotary assembly, the selected position corresponds to the minor axis of the elliptical paths (90°-270°). Starting from this origin position, the Y displacement carriage 17 is in its origin position (zero displacement in the Y direction for the paths T1, T2, and T3). The displacements of the carriage 17 in the Y direction are undertaken going away from the axis of rotation 9 between the position corresponding to the minor axis of the elliptical paths and the position corresponding to the major axis (0°-180°). The quadrant defined between the 90° direction and the 0° direction is subdivided into four angular sectors, each corresponding to an angular half-sector as defined above for speed modulation. In the first angular sector starting from the 90° direction, Y direction displacement is programmed to increase progressively from the value 0 to a value a for the path T1. Y displacement varies continuously from the value 0 to the value b for the path T2, and from the value 0 to the value c for the path T3.

In the second angular sector, Y displacement goes from a to a' for path T1, from b to b' for path T2, and from c to c' for path T3.

The Y direction displacements mentioned for each of the paths T1, T2, and T3 relative to the limits of the angular sectors take place on leaving each of the angular sectors. As mentioned above, the displacements on leaving the first angular sector are respectively a, b, and c, on leaving the second angular sector a', b', and c', on leaving the third angular sector a", b", and c", and on leaving the fourth angular sector a''', b''', and c'''. Starting from the 0° position, in order to follow the elliptical paths, the Y direction displacements are performed in the direction opposite to the above, i.e. towards the axis 9, as shown in FIG. 5 for the four angular sectors until the 270° position is reached. Thereafter, until the 180° position is reached, displacement per sector takes place progressively away from the axis 9, and finally from 180° to 90°, the displacements take place towards the axis 9. In each of the successive angular sectors, the Y displacements are symmetrical with the displacements in the sectors located in positions that are symmetrical relative to the 0°-180° axis.

As a result, the welding torch 20 and the electrode 20' are caused to be displaced along elliptical paths that are well controlled by previously calculating the parameters for defining the Y direction displacements in each of the angular sectors.

When the angular speed of rotation of the welding torch is adjusted to the same value per angular sector, as described above, for the three elliptical paths T1, T2, and T3, the linear speed of the electrode relative to the facing is slightly greater for the path T2 than for the path T1, and likewise slightly greater for the path T3 than for the path T2. These linear speed differences are small and have no incidence on the quality and the constant nature of the characteristics of the weld beads deposited on the bottom of the facing by the electrode welding a welding wire during its displacement along an elliptical path. In order to deposit a weld bead during a pass the linear speed of the electrode is practically constant.

Nevertheless, it is also possible to control the angular speed in each of the sectors to have different values for each of the paths T1, T2, and T3.

During the displacement of the electrode along each of the paths T1, T2, and T3, and as shown in FIG. 6, a respective weld bead 8a, 8b, and 8c is deposited on the bottom of the facing. The first pass of deposition during which the welding electrode moves along the path T1 serves to make the bead 8a on the bottom of the facing around the reserve of metal 11, with the displacement along the path T2 enabling the second weld bead 8b to be made so as to be superposed in part on the bead 8a, and when following the path T3, the third weld bead 8c is deposited on the second weld bead 8b and covers the outer portion of the facing that includes the stainless steel coating 6 on the wall 4.

In order to take account of the asymmetrical shape of the facing 7, it is necessary to offset the axis of rotation of the weld head from one welding pass to the next, with this offsetting of the axis possibly being obtained by varying the mounting of the weld head 16 on the shaft 15 or by adjusting the Y displacements so as to introduce the offset.

The first welding pass producing the first weld bead 8a is performed around an axis 9a of radial direction that is offset from the axis 9 of the spherical wall 4 in order to take account of the asymmetrical shape of the bottom of the facing relative to the axis 9. The second welding pass producing the weld bead 8b is performed around an axis 9b of radial direction that is closer to the axis 9, and the third welding pass is performed about an axis 9c coinciding with the axis 9 of the hemispherical wall 4.

During the displacement of the welding torch along the elliptical paths, the welding current is controlled as is the feed rate of the welding material (in the form of a coated wire) so as to obtain welding beads having characteristics that are accurately constant.

Adjusting the displacement conditions of the welding torch to a linear speed that is constant relative to the facing, and adjusting the welding torch make it possible to obtain speeds of section and metallurgical quality that are accurately constant over the entire periphery of the facing.

A buttering layer 8 is thus obtained by juxtaposing and superposing welding beads such as 8a, 8b, and 8c (shown in FIG. 6) that present very good quality and that can be made in a manner that is entirely automatic and programmed, thereby significantly reducing the time required for making the buttering layer. After the buttering layer 8 has been deposited, the surface of the buttering layer is machined and then the bore 5 for mounting the through tube is drilled, where said drilling is performed between the reserve of metal 11 in the central portion of the facing and through a portion of the buttering layer, as can be seen in FIG. 6.

Thereafter, the through tube is mounted tightly (e.g. using liquid nitrogen) in the bore 5 and the through tube is welded by depositing a welding material that is metallurgically compatible with the buttering material and with the metal of the through tube in a chamfer formed in the remaining portion of the facing between the through tube and the buttering layer.

The through tube can be welded automatically, e.g. by a method of the kind described in a patent application filed on the same day as the present application, with an automatic welding head being set into rotation about the axis of the through tube on a shaft mounted on said axis inside the through tube.

Naturally, after buttering by performing the method of the invention, the tube may be welded by any other automatic welding method, or even by manual welding.

In all cases, performing the buttering operation in automatic manner makes it possible to reduce significantly the time required for executing the operations of fixing the adapter and of obtaining very good metallurgical quality for the bond.

The invention is not limited to securing adapters passing through a vessel head, but can be used for securing any cylindrical tubular element passing through a spherical wall.

The invention can find applications outside building and repairing nuclear reactors.

What is claimed is:

1. A buttering method of depositing a welding material in an annular facing machined in a concave inside surface of a spherical wall at a periphery of a zone of the spherical wall that is to receive a through tube, the welding material is deposited automatically by performing the following operations:

causing a welding torch comprising means for melting and means for feeding welding material to rotate about an axis of rotation; and simultaneously causing the welding torch to move in a direction perpendicular to the axis of rotation in a controlled manner, and adjusting the position of the welding torch in a direction parallel to the axis of rotation in such a manner as to deposit the welding material in the annular facing in the form of at least one elliptical weld having characteristics that are constant;

wherein the axis of rotation extends in a direction that is radial relative to the spherical wall and passes through a central point of the annular facing where the inside surface of the spherical wall intersects the axis of the through tube.

2. A method according to claim 1, wherein the welding material is deposited in successive passes in order to deposit successive weld beads of elliptical shape extending around the entire periphery of the annular facing, which beads are superposed and juxtaposed in the direction perpendicular to the axis of rotation, by displacing the welding head through a predetermined fixed direction in the direction perpendicular to the axis of rotation between two successive welding passes.

3. A method according to claim 2, wherein the successive passes for depositing successive weld beads are performed by causing the welding torch to rotate about axes of rotation extending in a radial direction relative to the spherical surface, which axes are offset relative to one another in the direction perpendicular to the direction that is radial to the spherical surface.

4. A buttering method of depositing a welding material in an annular facing machined in a concave inside surface of a spherical wall at a periphery of a zone of the spherical wall that is to receive a through tube, wherein the welding material is deposited automatically by performing the following operations:

causing a welding torch comprising means for melting and means for feeding welding material to rotate about an axis of rotation extending in a direction that is radial relative to the spherical wall and that passes through a central point of the annular facing where the inside surface of the spherical wall intersects the axis of the through tube; and simultaneously causing the welding torch to move in a direction perpendicular to the axis of rotation in a controlled manner, and adjusting the position of the welding torch in a direction parallel to the axis of rotation in such a manner as to deposit the welding material in the annular facing in the form of at least one elliptical weld bead having characteristics that are constant;

wherein the speed of angular rotation of the welding torch about the axis of rotation is caused to vary in a discontinuous manner in order to obtain a substantially constant linear speed of displacement for an electrode of the welding torch relative to the annular facing, the electrode of the welding torch following a path that is elliptical while facing the annular facing; and further wherein a first plurality of angular sectors of constant amplitude is determined about the axis of rotation of the welding torch, and for each of the angular sectors, a speed of angular rotation being determined to which the welding torch is subjected during its displacement within the angular sector along a portion of the elliptical path.

5. A buttering method of depositing a welding material in an annular facing machined in a concave inside surface of a spherical wall at a periphery of a zone of the spherical wall that is to receive a through tube, wherein the welding material is deposited automatically by performing the following operations:

causing a welding torch comprising means for melting and means for feeding welding material to rotate about an axis of rotation extending in a direction that is radial relative to the spherical wall and that passes through a central point of the annular facing where the inside surface of the spherical wall intersects the axis of the through tube; and simultaneously causing the welding torch to move in a direction perpendicular to the axis of rotation in a controlled manner, and adjusting the position of the welding torch in a direction parallel to the axis of rotation in such a manner as to deposit the welding material in the annular facing in the form of at least one elliptical weld bead having characteristics that are constant;

wherein programmed displacements are determined for the welding torch in the Y direction perpendicular to the axis of rotation simultaneously with rotation of the welding torch about the axis of rotation by determining a second plurality of angular sectors of constant amplitude about the axis of rotation and by determining, for each of the angular sectors in the second plurality of angular sectors followed by the welding torch during rotation about the axis of rotation, a respective initial value on entry into the angular sector and a final value on exit from the angular sector for the displacement of the welding torch in the Y direction, between which values the displacement of the welding torch in the Y direction varies in continuous manner during the displacement of the welding torch within the angular sector.

6. A method according to claim 5, wherein at least two weld beads are deposited that are superposed and juxtaposed in the Y direction within the facing by successive passes during each of which the welding torch moves along an elliptical path, and different displacement values in the Y direction are determined for the welding torch for each of the elliptical paths within each of the angular sectors of the second plurality of angular sectors.

\* \* \* \* \*